United States Patent
Yamanaka et al.

(10) Patent No.: US 9,057,413 B2
(45) Date of Patent: Jun. 16, 2015

(54) FLOATING BRAKE DISK ASSEMBLING METHOD

(75) Inventors: Naoki Yamanaka, Takatsuki (JP); Masayoshi Hayashide, Takatsuki (JP); Fumihiko Metsugi, Takatsuki (JP)

(73) Assignee: SUNSTAR ENGINEERING INC., Osaka (JP)

( * ) Notice: Subject to any disclaimer, the term of this patent is extended or adjusted under 35 U.S.C. 154(b) by 309 days.

(21) Appl. No.: 13/266,880

(22) PCT Filed: Apr. 19, 2010

(86) PCT No.: PCT/JP2010/056926
§ 371 (c)(1),
(2), (4) Date: Oct. 28, 2011

(87) PCT Pub. No.: WO2010/125939
PCT Pub. Date: Nov. 4, 2010

(65) Prior Publication Data
US 2012/0097491 A1    Apr. 26, 2012

(30) Foreign Application Priority Data

Apr. 30, 2009  (JP) .................................. 2009-111032

(51) Int. Cl.
*B21D 39/00* (2006.01)
*F16D 65/12* (2006.01)
(Continued)

(52) U.S. Cl.
CPC ........... *F16D 65/12* (2013.01); *Y10T 29/49826* (2015.01); *Y10T 29/53* (2015.01);
(Continued)

(58) Field of Classification Search
USPC ................... 29/505, 509, 511–512, 521, 525, 29/525.01, 525.05, 700; 188/218 XL
See application file for complete search history.

(56) References Cited

U.S. PATENT DOCUMENTS

| 5,301,414 A | * | 4/1994 | Gautheron | ..................... 29/451 |
| 7,322,091 B2 | * | 1/2008 | Katoh et al. | ..................... 29/436 |

(Continued)

FOREIGN PATENT DOCUMENTS

| JP | 58-154117 | 9/1983 |
| JP | 6-40537 | 5/1994 |

(Continued)

OTHER PUBLICATIONS

International Search Report for International Application No. PCT/JP2010/056926 dated Jul. 23, 2010.

*Primary Examiner* — Alexander P Taousakis
(74) *Attorney, Agent, or Firm* — Kratz, Quintos & Hanson, LLP

(57) ABSTRACT

Provided are a floating brake disk assembling method and a floating brake disk, and a floating brake disk assembling device, wherein a washer or a spring member can be accurately attached to a coupling pin. In the floating disk brake assembling method, a coupling pin 32 for coupling a brake disk (10) to a hub disk (20), which has a cylindrical body portion (41) to be mounted in a coupling hole (31), a first jaw portion (42) formed in one end portion of the body portion (41), and a portion to be swaged (43A) continuous to the other end portion of the body portion (41), is used; and the portion to be swaged (43A) is swaged so that a second jaw portion (42) having a diameter larger than that of the body portion (41) can be formed. The second jaw portion is formed by swaging the portion to be swaged (43A) while the coupling pin (32) is mounted in the coupling hole (31), and the spring member (33) and the washer (34) are attached to the outside of the coupling pin (32), to compress and deform the spring member (33) via the washer (34).

7 Claims, 8 Drawing Sheets

(51) Int. Cl.
*F16D 65/02* (2006.01)
*F16D 69/00* (2006.01)

(52) U.S. Cl.
CPC ... *F16D2065/026* (2013.01); *F16D 2065/1368* (2013.01); *F16D 2065/1392* (2013.01); *F16D 2069/004* (2013.01); *F16D 2250/00* (2013.01); *F16D 2250/0092* (2013.01)

(56) References Cited

U.S. PATENT DOCUMENTS

| | | | |
|---|---|---|---|
| 7,464,452 B2 * | 12/2008 | Yamamoto et al. | 29/505 |
| 8,250,898 B2 * | 8/2012 | Takenaka et al. | 72/356 |
| 8,267,228 B2 * | 9/2012 | Hoshi et al. | 188/218 XL |
| 2007/0102247 A1 * | 5/2007 | Takenaka et al. | 188/26 |
| 2013/0112515 A1 * | 5/2013 | Shinagawa | 188/218 XL |

FOREIGN PATENT DOCUMENTS

| | | |
|---|---|---|
| JP | 6-69463 | 9/1994 |
| JP | 6-76727 | 10/1994 |
| JP | 8-312700 | 11/1996 |
| JP | 2001-187910 A1 | 7/2001 |

\* cited by examiner (a)

(b)

FLOATING BRAKE DISK ASSEMBLING METHOD

TECHNICAL FIELD

The present invention relates to a method for assembling a floating brake disk which can be preferably used as a brake disk of a disk brake system for a motorcycle and a floating brake disk assembled by the method, and a device for assembling a floating brake disk.

BACKGROUND ART

Generally, as a brake disk of a disk brake system for a motorcycle, there has been widely put to practical use a so-called floating brake disk which is provided with an annular braking disk against which a brake pad is to be pressed, a hub disk to be attached to the inside of the braking disk, and a plurality of connecting means for connecting both of the disks to each other in a floating state and configured to be able to prevent the brake disk from being deformed and warped in whole due to heat generation when a brake is operated by utilizing a space between both of the disks.

As for the connecting means, there has been widely used connecting means which is configured in such a manner that a plurality of braking side connecting concave portions is formed in an inner circumferential portion of the braking disk, a plurality of hub side connecting concave portions opposed to the braking side connecting concave portions is formed in an outer circumferential portion of the hub disk, connecting pins are respectively mounted in connecting holes each of which is formed by combining each of the braking side connecting concave portions with the respective hub side connecting concave portions, a disk spring and a washer are attached to the outside of the connecting pin, and an end portion of the connecting pin is swaged so as to connect both of the disks in a floating state through the disk spring (see Patent Document 1, for example).

As for the connecting pin, there has been used a connecting pin which is provided with a substantially cylindrical body portion to be mounted in a connecting hole with substantially no space therebetween, a first flange portion formed in one end portion of the body portion and having a diameter larger than that of the connecting hole, a to-be-swaged portion formed in the other end portion of the body portion and having a diameter smaller than that of the body portion, and a stepped portion formed in a boundary between the body portion and the to-be-swaged portion, and configured such that the body portion is mounted in the connecting hole in a state that a disk spring is attached to the body portion and the to-be-swaged portion is then swaged in this state to form a second flange portion, so that the disk spring and the connecting pin are fixed to both of the disks through the second flange portion to thereby connect both of the disks in a floating state, as described in Patent Document 1.

In the meantime, as for a method for swaging the to-be-swaged portion of the connecting pin, there are known a method in which an insert is inserted into the to-be-swaged portion and then rotated so as to gradually extend the diameter of the to-be-swaged portion to thereby swage the to-be-swaged portion as described in Patent Document 1 and a method in which the to-be-swaged portion is pressed by a punch having a molded portion which is fitted into the second flange portion to thereby swage the to-be-swaged portion as described in Patent Document 2.

CITATION LIST

Patent Literature

Patent Document 1: JP-U No. 6-76727
Patent Document 2: JP-A No. 8-312700

SUMMARY OF INVENTION

Technical Problem

In the methods described in Patent Documents 1 and 2, since the to-be-swaged portion is swaged against a spring force of the disk spring, corners of inner circumferential edges of the washer and the disk spring get stuck in a base portion of an outer circumferential surface of the to-be-swaged portion, which is trying to extend outwardly when being swaged, along the way. As a result of this, the second flange portion is not accurately formed in a direction perpendicular to a central axis of the connecting pin and the washer and the disk spring are obliquely disposed. Therefore, the connection between both of the disks by the connecting means becomes imbalanced, thereby causing a problem in that the connection strength between both of the disks is decreased and vibrations and noises are likely to be generated at the time of braking. Further, in the swaging method described in Patent Document 1, there is also a problem in that a corrosion-resistant coating formed on a surface of the connecting pin is damaged by pressing the insert against the connecting pin.

It is an object of the present invention to provide a floating brake disk assembling method which is capable of accurately attaching a washer and a spring member with respect to a connecting pin and a floating brake disk assembled by the method, and a floating brake disk assembling device.

Solution to Problem

According to the present invention, there is provided a method for assembling a floating brake disk, the floating brake disk comprising an annular plate braking disk having a plurality of braking side connecting concave portions formed on an inner circumferential portion of the braking disk, a hub disk having a plurality of hub side connecting concave portions opposed to the braking side connecting concave portions on an outer circumferential portion of the hub disk and fitted to an inside of the braking disk, a connecting pin mounted in a connecting hole formed by butting both of the connecting concave portions together, and a spring member attached to an outside of the connecting pin, the connecting pin including a cylindrical body portion to be attached to the connecting hole with substantially no space between the body portion and the connecting hole, a first flange portion formed on one end portion of the body portion and having a diameter larger than the diameter of the body portion and a to-be-swaged portion continuously provided on the other end portion of the body portion and capable of forming a second flange portion having a diameter larger than the diameter of the body portion by swaging the to-be-swaged portion, wherein the connecting pin is mounted in the connecting hole, the spring member is attached to the outside of the connecting pin and the to-be-swaged portion is swaged in a state that the spring member is being compressed and deformed to form the second flange portion. In this regard, it is also possible that the spring member and a washer are attached to the outside of the body portion so that the washer is located between the spring member and the second flange portion and the to-be-swaged portion is swaged in a state that the spring member is being compressed and deformed through the washer. Further, it is also possible that the to-be-swaged portion is swaged in such a state that the spring member is being directly compressed and deformed without providing the washer.

In this assembling method, when the to-be-swaged portion of the connecting pin is swaged, since the to-be-swaged portion of the connecting pin is swaged in a state that the spring member, which is composed of a disk spring, a wave spring and the like, is being compressed and deformed to form the second flange portion, it is possible to prevent a corner of an inner circumferential edge of the washer and an inner circumferential edge of the spring member from getting stuck in a base portion of an outer circumferential surface of the to-be-swaged portion which is trying to extend outwardly when being swaged. As a result of this, it is possible to accurately form the second flange portion in the direction perpendicular to the central axis of the connecting pin, thereby making it possible to accurately mount the washer and the spring member. Therefore, it becomes possible to effectively prevent a decrease of the connection strength between both of the disks and generation of vibrations and noises at the time of braking caused by a swaging defect in the connecting pin.

Further, the to-be-swaged portion can be press molded by a punch to form the second flange portion. In this case, since an operating time for swaging can be shortened compared to the case in which an insert is used for swaging, and a plurality of connecting pins can be swaged at the same time, it is possible to significantly improve an operating efficiency of the swaging operation of the connecting pin. Further, this case is preferred since damages of the corrosion-resistant layer can be prevented compared to the case using the insert. In this regard, it is also possible that the insert is pressed against the to-be-swaged portion with being rotated to form the to-be-swaged portion into the second flange portion.

It is also a preferred embodiment that the connecting pin is mounted in the connecting hole, the spring member and a washer are attached to the outside of the connecting pin, and the to-be-swaged portion is swaged in a state that the spring member is being compressed and deformed through the washer to form the second flange portion. In this case, it is possible to prevent corners of inner circumferential edges of the washer and the spring member from getting stuck in a base portion of an outer circumferential surface of the to-be-swaged portion which is trying to extend outwardly when being swaged. As a result of this, it is possible to accurately form the second flange portion in the direction perpendicular to the central axis of the connecting pin, thereby making it possible to accurately mount the spring member.

It is a preferred embodiment that the connecting pin is made of an aluminum alloy. An aluminum alloy is preferred because it is lighter than an iron-based metal such as a stainless, has an excellent workability and can be easily swaged.

Further, it is possible that the connecting pin including the to-be-swaged portion having a chamfered surface formed on an outer circumferential surface of a tip portion of the to-be-swaged portion and whose inner circumferential surface has a uniform diameter throughout the entire length, and a corrosion-resistant layer formed on an surface thereof is used as the connecting pin. Since the chamfered surface is formed on the outer circumferential surface of the tip portion of the to-be-swaged portion and the inner circumferential surface of the to-be-swaged portion has a uniform diameter throughout the entire length thereof in this connecting pin, even if a corrosion-resistant layer is previously formed on the connecting pin, it is possible to prevent the corrosion-resistant layer from being damaged when the to-be-swaged portion is swaged.

Further, the to-be-swaged portion can be swaged to form the flange portion so that a surface of the flange portion which faces the disks can come into surface contact with the washer with substantially no space therebetween. Therefore, the contact areas between the washer and the flange portion of the connecting pin and between the both of the disks and the flange portion of the connecting pin can be set to be large, thereby improving the pull-out strength of the connecting pin.

Furthermore, it is possible to form a tapered surface, an annular curved surface having a convex arc cross-sectional shape or an annular curved surface having a concave arc cross-sectional shape as the chamfered surface. By forming such a chamfered surface, it is possible to prevent the corrosion-resistant layer from being damaged when the to-be-swaged portion is swaged.

A floating brake disk according to the present invention is assembled by the above-described floating brake disk assembling method. Therefore, in this floating brake disk, as described in the assembling method, when the to-be-swaged portion of the connecting pin is swaged, since the to-be-swaged portion of the connecting pin is swaged in a state that the spring member, which is composed of a disk spring, a wave spring and the like, is being compressed and deformed to form the second flange portion, it is possible to prevent the corner of the inner circumferential edge of the washer and an inner circumferential edge of the spring member from getting stuck in the base portion of the outer circumferential surface of the to-be-swaged portion which is trying to extend outwardly when being swaged. As a result of this, it is possible to accurately form the second flange portion in the direction perpendicular to the central axis of the connecting pin, thereby making it possible to accurately mount the washer and the spring member. Therefore, it becomes possible to effectively prevent the decrease of the connection strength between both of the disks and the generation of vibrations and noises at the time of braking caused by the swaging defect in the connecting pin.

According to the present invention, there is provided a device for assembling a floating brake disk, the floating brake disk comprising an annular plate braking disk having a plurality of braking side connecting concave portions formed on an inner circumferential portion of the braking disk, a hub disk having a plurality of hub side connecting concave portions opposed to the braking side connecting concave portions on an outer circumferential portion of the hub disk and fitted to an inside of the braking disk, a connecting pin mounted in a connecting hole formed by butting both of the connecting concave portions together, and a spring member attached to an outside of the connecting pin, the connecting pin including a cylindrical body portion to be attached to the connecting hole with substantially no space between the body portion and the connecting hole, a first flange portion formed on one end portion of the body portion and having a diameter larger than the diameter of the body portion and a to-be-swaged portion continuously provided on the other end portion of the body portion and capable of forming a second flange portion having a diameter larger than the diameter of the body portion by swaging the to-be-swaged portion, wherein the device comprises a supporting board for horizontally supporting both of the disks in a state that each of the braking side connecting concave portions is butted to each of the hub side connecting concave portions so as to form the connecting hole when the hub disk is fitted to the inside of the braking disk, longitudinally supporting the connecting pin in a state that the first flange portion is located at a lower side, and inserting and mounting the connecting pin at a predetermined height with respect to the connecting hole, compression means for compressing the spring member attached to an outside of a part of the body portion of the connecting pin, the part protruding upward from both of the disks, and swaging means for swaging the to-be-swaged portion of the connecting pin from above to form the second flange portion.

In this assembling device, when the to-be-swaged portion is swaged by the swaging means, the spring member such as a disk spring and a wave spring is compressed by the compression means. Therefore, it is possible to prevent the corner of the inner circumferential edge of the washer and the inner circumferential edge of the spring member from getting stuck in the base portion of the outer circumferential surface of the to-be-swaged portion which is trying to extend outwardly when being swaged. As a result of this, it is possible to accurately form the second flange portion in the direction perpendicular to the central axis of the connecting pin, thereby making it possible to accurately mount the washer and the spring member. Therefore, it becomes possible to effectively prevent the decrease of the connection strength between both of the disks and the generation of vibrations and noises at the time of braking caused by the swaging defect in the connecting pin.

As the swaging means, swaging means including a punch for swaging the to-be-swaged portion by press molding can be used. In this case, it is a preferred embodiment that the compression means includes a compression member attached to an outside of the punch for compressing the spring member and biasing means for continuously biasing the compression member downward so that the to-be-swaged portion can be press molded by the punch in a state that the spring member is being compressed by the compression member.

As the swaging means, it is also possible to use an insert for swaging the to-be-swaged portion by rotating the insert while a tip portion of the insert is pressed against the to-be-swaged portion.

Further, as the compression means, it is possible to use compression means which compresses the spring member through a washer attached to the outside of the body portion of the connecting pin. In this case, since the spring member is compressed by the compression means through the washer when the to-be-swaged portion of the connecting pin is swaged by the swaging means, it is possible to prevent the corner of the inner circumferential edge of the washer and the inner circumferential edge of the spring member from getting stuck in the base portion of an outer circumferential surface of the to-be-swaged portion which is trying to extend outwardly when being swaged. As a result of this, it is possible to accurately form the second flange portion in the direction perpendicular to the central axis of the connecting pin, thereby making it possible to accurately mount the washer and the spring member.

Advantageous Effects of Invention

According to the floating disk assembling method and the floating brake disk assembled by the method, and the floating disk assembling device of the present invention, when the to-be-swaged portion of the connecting pin is swaged, since the to-be-swaged portion of the connecting pin is swaged in a state that the spring member, which is composed of a disk spring, a wave spring and the like, is being compressed and deformed to form the second flange portion, it is possible to prevent the corner of the inner circumferential edge of the washer and the inner circumferential edge of the spring member from getting stuck in the base portion of an outer circumferential surface of the to-be-swaged portion which is trying to extend outwardly when being swaged. As a result of this, it is possible to accurately form the second flange portion in the direction perpendicular to the central axis of the connecting pin, thereby making it possible to accurately mount the washer and the spring member. Therefore, it becomes possible to effectively prevent the decrease of the connection strength between both of the disks and the generation of vibrations and noises at the time of braking caused by a swaging defect in the connecting pin.

BRIEF DESCRIPTION OF THE DRAWINGS

FIGS. 7(a) and 7(b) are explanatory drawings of a brake disk assembling method, wherein
FIG. 7(a) is an explanatory drawing illustrating a state just before starting compression of a spring member and FIG. 7(b) is an explanatory drawing illustrating a state after compressing the spring member and just before starting swaging.

DESCRIPTION OF EMBODIMENTS

Next, embodiments of the present invention will be described with reference to the drawings.

Figure 1:
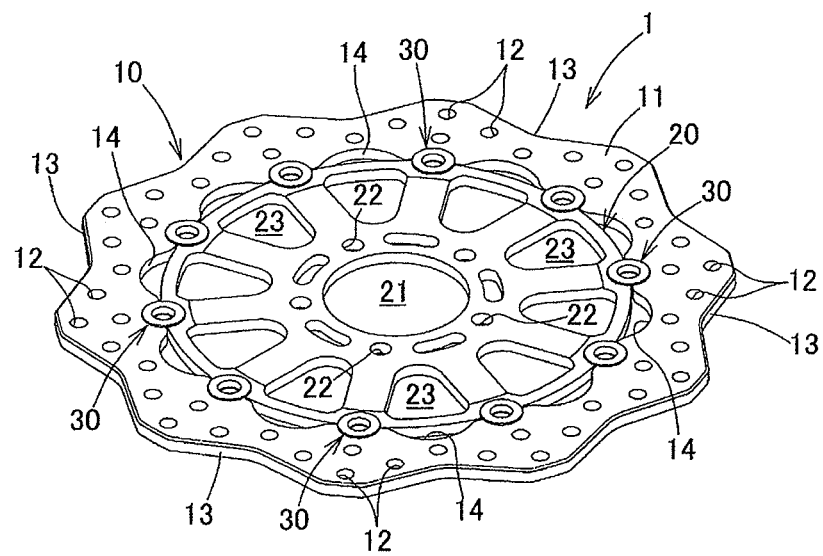
FIG. 1 is a perspective view illustrating a brake disk.
Figure 2:
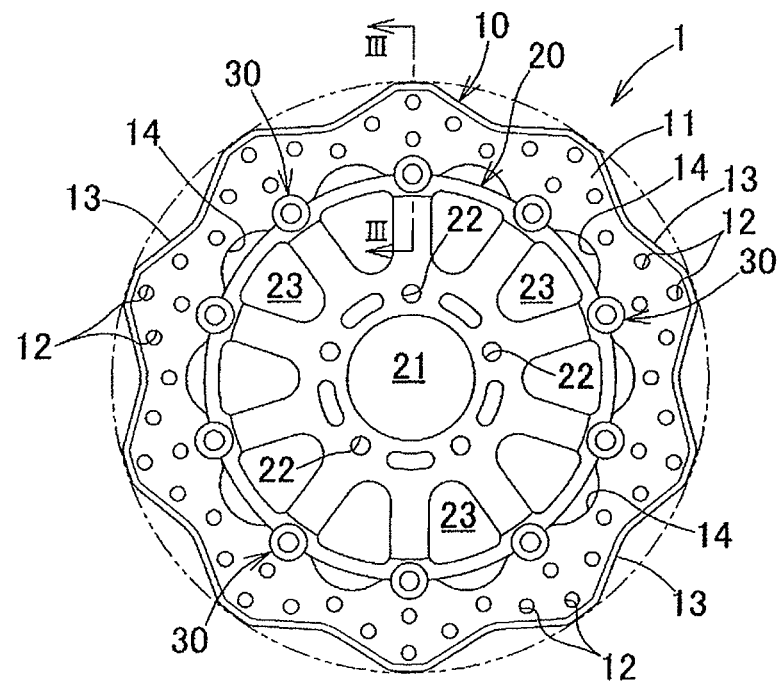
FIG. 2 is a front view illustrating the brake disk.
Figure 3:
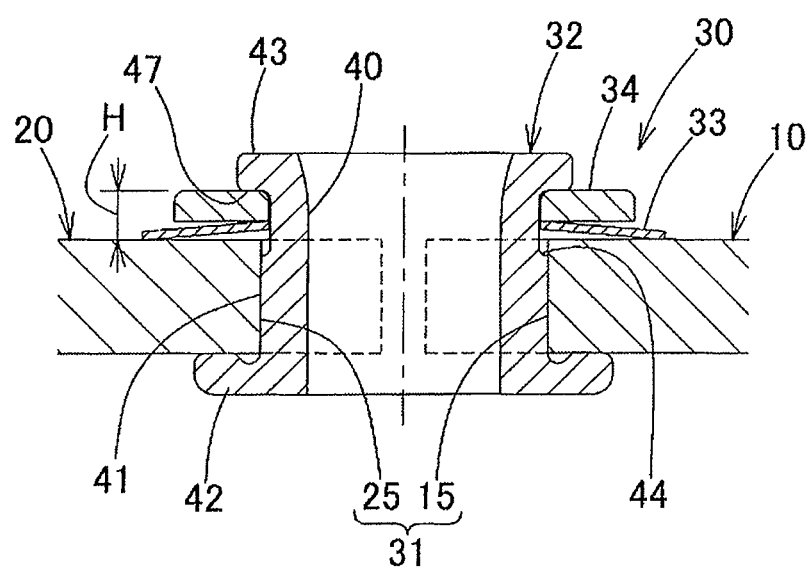
FIG. 3 is a cross-sectional view taken along the line III-III in FIG. 2.

As shown in FIGS. 1 to 3, a floating brake disk 1 is a brake disk for a motorcycle and provided with an annular plate braking disk 10, a hub disk 20 attached to the inside of the braking disk 10 with a predetermined space therebetween, and a plurality of connecting means 30 for connecting the braking disk 10 and the hub disk 20 to each other in a floating state.

The braking disk 10 is manufactured in such a manner that a flat metal plate made of a stainless steel or a carbon steel and having an excellent wear-resistant property is subjected to press molding and an annular sliding portion 11 to which a brake pad (not shown in the drawings) is to be slidingly contacted is then subjected to a heat treatment. A plurality of small holes 12 is formed on the sliding portion 11 in order to improve a heat releasing property and also reduce a weight thereof. As for the small holes 12, it is also possible to form long holes having an elongated slit-like shape other than the round holes as shown in FIGS. 1 and 2. Further, the shape, number, and arrangement of the small holes 12 can be appropriately determined in view of the design characteristics of the brake disk 1 and the heat releasing property in the sliding portion 11. A plurality of concave portions 13 and 14 are respectively formed in an outer circumferential portion and an inner circumferential portion of the braking disk 10 at regular intervals in a circumferential direction of the braking disk 10. Accordingly, the brake disk 1 is configured so as to improve the heat releasing property, facilitate a reduction in weight, and express novelty in design. The number and shape of the concave portions 13 and 14 can be arbitrarily determined. In this regard, the present invention can be applied to the brake disk 1 in which at least one of the concave portion 13 or the concave portion 14 is omitted in the same manner. Further, the size of the braking disk 10 can be set at 300 mm in outer diameter and 6 mm in thickness, for example.

The hub disk 20 is made of a light metal material such as an aluminum alloy in order to reduce its weight, for example. In a central portion of the hub disk 20, there are formed a mounting hole 21 into which an end portion of a wheel hub is inserted and a plurality of bolt inserting holes 22 surrounding the mounting hole 21 for mounting the hub disk 20 to the wheel hub. Further, a plurality of lightening holes 23 is formed in a midway portion in a radial direction of the hub disk 20 at regular intervals in a circumferential direction thereof.

Although the braking disk 10 and the hub disk 20 are arranged in the same plane in the brake disk 1 shown in FIGS. 1 to 3, the braking disk 10 and the hub disk 20 can also be arranged in different planes which are parallel to each other with a certain space therebetween in a thickness direction (a central axis direction) of the brake disk 1 depending on the structure of a vehicle body. Further, the thickness of the braking disk 10 and the thickness of the hub disk 20 can be set to be the same and can also be set to be different. In this regard, the present invention is characterized in the assembling method of the brake disk 1. Therefore, as for the structures of the braking disk 10 and the hub disk 20, it is possible to appropriately employ existing structures.

The connecting means 30 are formed between the braking disk 10 and the hub disk 20 at regular intervals in the circumferential direction of the braking disk 10 and the hub disk 20. In FIG. 1, the braking disk 10 and the hub disk 20 are connected in a floating state by ten connecting means 30. However, the braking disk 10 and the hub disk 20 can also be connected in a floating state using the connecting means 30 of the number other than ten.

Now, the connecting means 30 will be described. As shown in FIGS. 1 to 3, semicircular braking side connecting concave portions 15 are formed in an inner circumferential portion of the braking disk 10 at the disposing positions of the connecting means 30. On the other hand, semicircular hub side connecting concave portions 25 are formed in an outer circumferential portion of the hub disk 20 so as to be opposed to the braking side connecting concave portions 15. Connecting holes 31 each having a substantially circular shape are formed between both of the disks 10 and 20 by the connecting concave portions 15 and 25 when the both of the disks 10 and 20 are in a combined state. A connecting pin 32 is mounted in each of the connecting holes 31 so as to restrict a relative rotation and a relative movement in an axial direction between both of the disks 10 and 20. A spring member 33 composed of a disk spring for biasing both of the disks 10 and 20 so that the both of the disks 10 and 20 can be located in the same plane and a washer 34 for receiving the spring member 33 are attached to the connecting pin 32. Both of the disks 10 and 20 are connected in a floating state through the connecting pin 32, the spring member 33, and the washer 34. However, the washer 34 can be omitted.

As shown in FIG. 3, the connecting pin 32 is made of a light metal material such as an aluminum alloy and a magnesium alloy and composed of a cylindrical hollow member having a central hole 40. Further, the connecting pin 32 is provided with a cylindrical body portion 41 to be attached to the inside of the connecting hole 31 with substantially no space therebetween, a retaining first flange portion 42 formed on one end portion of the body portion 41 and having a diameter larger than that of the connecting hole 31, and a retaining second flange portion 43 formed on the other end portion of the body portion 41, having a diameter larger than that of the connecting hole 31 and formed by swaging a to-be-swaged portion 43A of a connecting pin 32A shown in FIGS. 4(a), 6 and 7.

Figure 4:
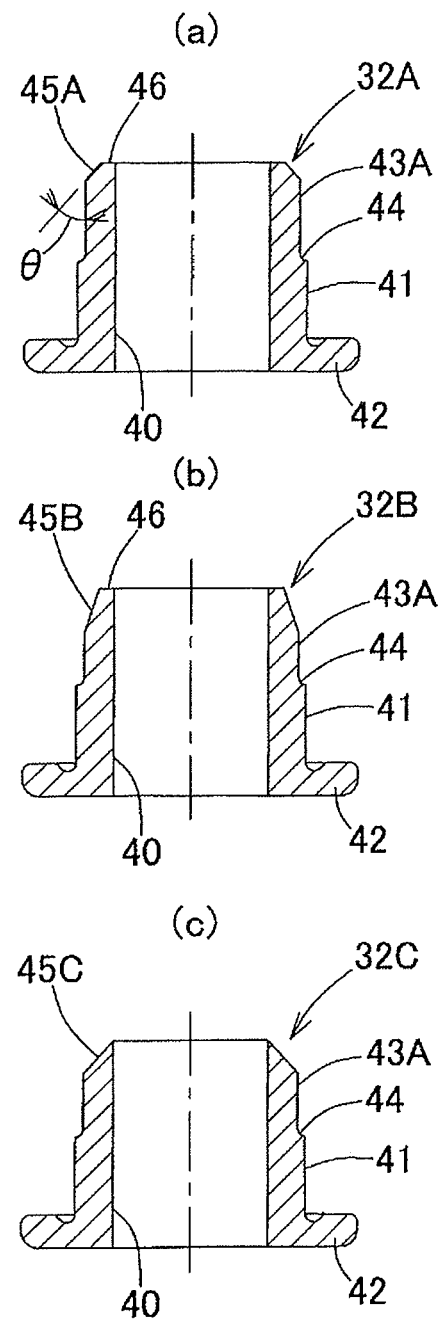
FIG. 4(a) is a longitudinal cross-sectional view illustrating a connecting pin and FIGS. 4(b) and 4(c) are longitudinal cross-sectional views each illustrating a connecting pin having another structure.

The connecting pin 32A shown in FIG. 4(a) is in such a state that the second flange portion 43 of the connecting pin 32 has not yet been formed by swaging. A cylindrical to-be-swaged portion 43A is continuously provided on an upper end portion of the body portion 41 corresponding to the second flange portion 43. The connecting pin 32A is subjected to an alumite treatment or a plating treatment so as to form a corrosion-resistant layer (not shown in the drawings) such as an aluminum oxide film or a chromed layer on a surface of the connecting pin 32A. In this regard, the connecting pin 32 can also be made of a metal material other than a light alloy such as a stainless material and the like, for example. In this case, the anti-corrosion treatment may be omitted.

A stepped portion 44 is formed in a midway portion in a length direction of an outer circumferential surface of the body portion 41 of the connecting pin 32A. An upper part of the body portion 41 located above the stepped portion 44 is configured to have a diameter smaller than that of a lower part of the body portion 41 located below the stepped portion 44. Further, the outer diameter of the to-be-swaged portion 43A is configured to be the same as that of the upper part of the body portion 41. In this regard, the stepped portion 44 can be formed at any position as long as deformation caused by the swaging does not cause an adverse effect on a part of the body portion 41 which is to be fitted to the connecting hole 31 with no space therebetween. For example, the stepped portion 44 can be formed in a boundary between the to-be-swaged portion 43A and the body portion 41. Further, although the above-described configuration is preferred since the swaging operation of the to-be-swaged portion 43A becomes easy when the stepped portion 44 is provided as described above and the to-be-swaged portion 43A is configured to have a diameter smaller than that of the body portion 41, it is also possible to use the connecting pin 32A without the stepped portion 44, namely, the connecting pin 32A in which the outer diameter of the to-be-swaged portion 43A is configured to be the same as that of the body portion 41.

In the connecting pin 32A, the diameter of the inner circumferential surface of the to-be-swaged portion 43A and the diameter of the inner circumferential surface of the body portion 41 are configured to be the same throughout the entire length. A conical chamfered surface 45A whose diameter is gradually reduced toward an edge thereof is formed on an outer circumferential portion of an end portion of the to-be-swaged portion 43A. Namely, the thickness of the outer circumferential portion of the end portion of the connecting pin 32A is reduced by forming the chamfered surface 45A. Further, since the diameter of the inner circumferential surface of the to-be-swaged portion 43A is configured to be the same throughout the entire length and the chamfered surface 45A is formed on the outer circumferential portion of the end portion of the connecting pin 32A in this manner, the corrosion-resistant layer of the connecting pin 32A is prevented from being damaged when the to-be-swaged portion 43A is swaged to form the second flange portion 43. Furthermore, an end face of the swaged second flange portion 43 which faces the washer 34 is formed into a wide annular surface 47 arranged in a plane in a direction perpendicular to the central axis of the connecting pin 32A. By forming the annular surface 47, the contact area between the second flange portion 43 and the washer 34 is made to be large, thereby increasing the pull-out strength of the connecting pin 32. However, it is also possible to omit the chamfered surface 45A and configure the end portion of the connecting pin 32A so as to have an end face perpendicular to the central axis of the connecting pin 32A.

Figure 5:
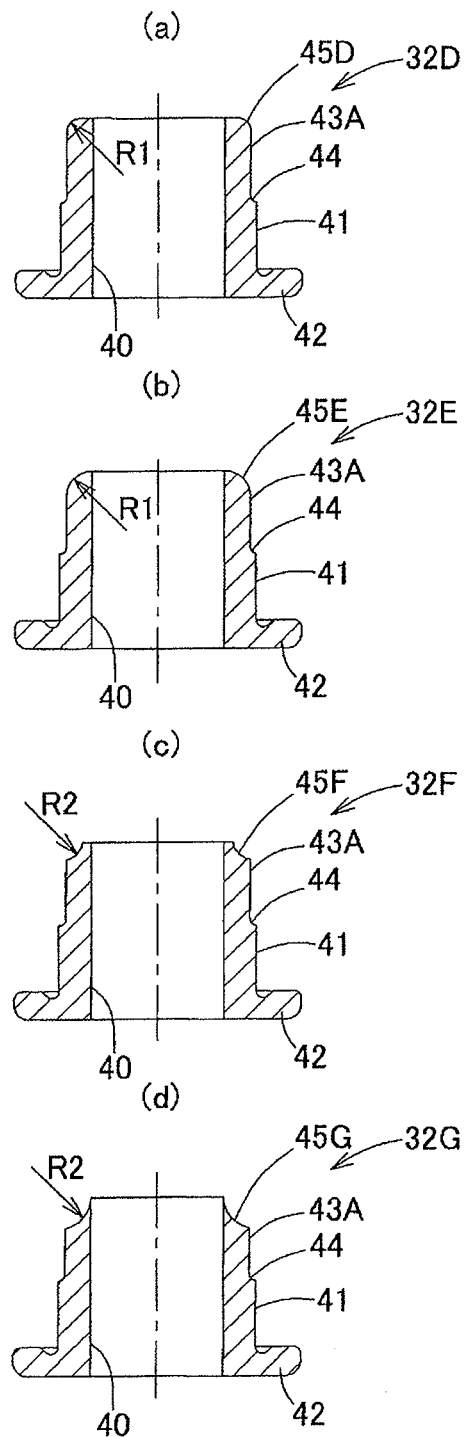
FIGS. 5(a) to 5(d) are longitudinal cross-sectional views each illustrating a connecting pin having yet another structure.

In this regard, as another embodiment of the connecting pin 32 in which the structure of the chamfered surface 45A is partially modified, it is possible to employ connecting pins 32B and 32C respectively shown in FIGS. 4(b) and 4(c) in which the inclination angles θ of chamfered surfaces 45B and 45C are changed. When the inclination angle θ is smaller than 20°, the pull-out strength of the connecting pin 32 is decreased due to a thin plate shape. On the other hand, when the inclination angle θ is larger than 45°, the pull-out strength is also decreased due to a spear shape (a tapered shape). Therefore, it is preferred that the inclination angle θ is set in the range of 20° to 45°. Further, as shown in FIGS. 4(a) and 4(b), it is also possible to form an annular end face 46 which is perpendicular to a central line of each of the connecting pins 32A and the 32B. Furthermore, it is also possible to form the chamfered surface 45C so as to have a sharp-pointed shape as in the connecting pin 32C shown in FIG. 4(c). Moreover, instead of the conical surface shaped chamfered surfaces 45A to 45C, as in connecting pins 32D and 32E respectively shown in FIGS. 5(a) and 5(b), it is also possible to form chamfered surfaces 45D and 45E each of which is composed of an annular curved surface having a convex arc cross-sectional shape and protruding outward in a radial direction of the connecting pins 32D and 32E, respectively. In addition to this, as in connecting pins 32F and 32G respectively shown in FIGS. 5(c) and 5(d), it is also possible to form chamfered surfaces 45F and 45G each of which is composed of an annular curved surface having a concave arc cross-sectional shape and protruding inward in a radial direction of the connecting pins 32F and 32G, respectively. The arc radius R1 of each of the chamfered surfaces 45D and 45E respectively shown in FIGS. 5(a) and 5(b) can be arbitrarily determined. However, it is preferred that the radius R1 is set in the range of 5 mm to 20 mm because the pull-out strength of the pin is decreased due to a spear shape (a tapered shape) when the radius R1 is smaller than 5 mm, and on the other hand a defect can be generated in the pin when the radius R1 is larger than 20 mm. Further, the arc radius R2 of each of the chamfered surfaces 45F and 45G respectively shown in FIGS. 5(c) and 5(d) can be arbitrarily determined. However, it is preferred that the radius R2 is set in the range of 5 mm to 20 mm because a defect can be generated in the pin when the radius R2 is smaller than 5 mm, and the other hand the pull-out strength of the pin is decreased due to a spear shape (a tapered shape) when the radius R2 is larger than 20 mm. Furthermore, it is also preferred to apply corners of an upper end portion and a lower end portion of each of the chamfered surfaces 45A to 45G roundness for preventing damages to the corrosion-resistant layer.

The spring member 33 and the washer 34 are attached to the outside of the body portion 41 between the first flange portion 42 and both of the disks 10 and 20. Both of the disks 10 and 20 are biased by the spring member 33 so as to be arranged in the same plane. In this regard, it is also possible to employ the connecting pin 32 which is provided with the body portion 41 whose cross-sectional shape is oval or quadrate such as square and rectangular. In this case, the connecting hole 31 is to be formed into a shape which is fitted to the body portion 41.

The spring member 33 is composed of a disk spring having a gentle conical shape as shown in FIG. 3. The distance H between the second flange portion 43 and both of the disks 10 and 20 is set to be somewhat shorter than the length that is a sum of the height of the spring member 33 in a natural state and the thickness of the washer 34 so that the spring member 33 can be compressed to some degree in a state of being disposed between the second flange portion 43 and both of the disks 10 and 20. In this regard, a wave spring can also be used instead of a disk spring as the spring member. Further, when the washer 34 is not provided, the distance H is to be set to be somewhat shorter than the height of the spring member 33 in a natural state.

An assembling device 50 of the floating brake disk 1 is provided with a supporting board 51 for supporting both of the disks 10 and 20 and the connecting pin 32A, the supporting board 51 horizontally supporting both of the disks 10 and 20 in such a state that the hub disk 20 is fitted to the inside of the braking disk 10 and the hub side connecting concave portion 25 is butted to the braking side connecting concave portion 15 so as to form the connecting hole 31, longitudinally supporting the connecting pin 32A in such a state that the first flange portion 42 is located at the lower side, and inserting and mounting the connecting pin 32A at a predetermined height with respect to the connecting hole 31, compression means 52 for compressing the spring member 33 attached to the outside of a part of the body portion 41 of the connecting pin 32A, the part protruding upward from both of the disks 10 and 20, through the washer 34 attached to the outside of the body portion 41 above the spring member 33, and the swaging means 53 for swaging the to-be-swaged portion 43A of the connecting pin 32A from the upper side to form the second flange portion 43.

The supporting board 51 is provided so as to correspond to the mounting position of the connecting pin 32 in the floating brake disk 1. Both of the disks 10 and 20 are substantially horizontally supported by mounting peripheral parts of the braking side connecting concave portion 15 and the hub side concave portion 25 on a plurality of the supporting boards 51. On the supporting board 51, a housing portion 54 for housing the first flange portion 42 of the connecting pin 32A to thereby longitudinally support the connecting pin 32A is provided so as to correspond to the mounting position of the connecting pin 32 in the floating brake disk 1. The depth of the housing portion 54 is set to be the height T deeper than the thickness of the first flange portion 42, wherein the height T is a height up to which the spring member 33 is deformable in the disposed state. In this regard, the supporting boards 51 can be provided independently corresponding to the mounting position of the connecting pin 32 and can also be composed of an integrated plate member on which the housing portions 54 are formed corresponding to the connecting pins 32.

Figure 6:
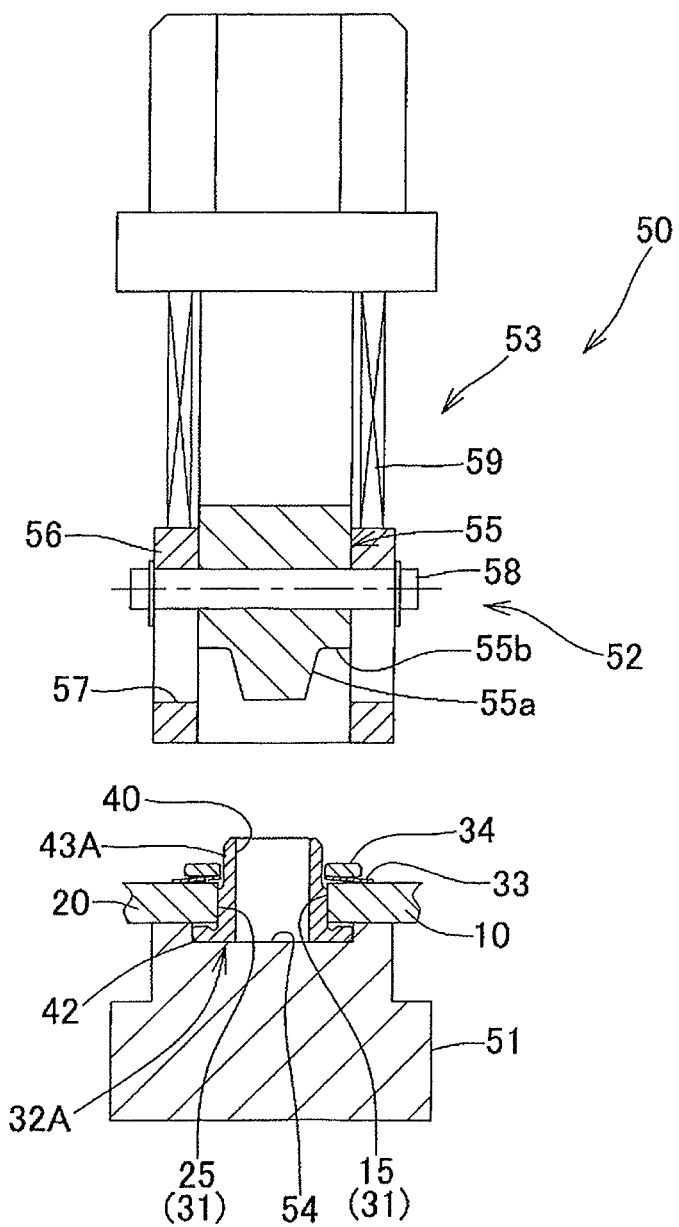
FIG. 6 is an explanatory drawing illustrating an assembling device using a press.
Figure 7:
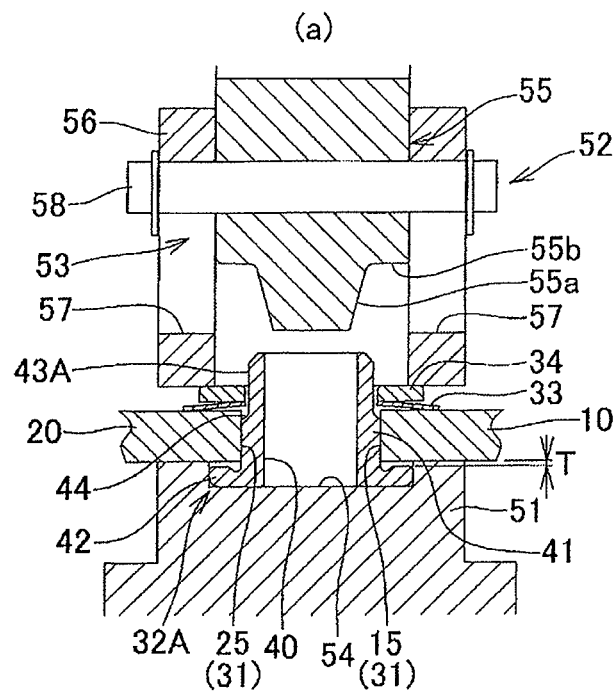
Figure 7:
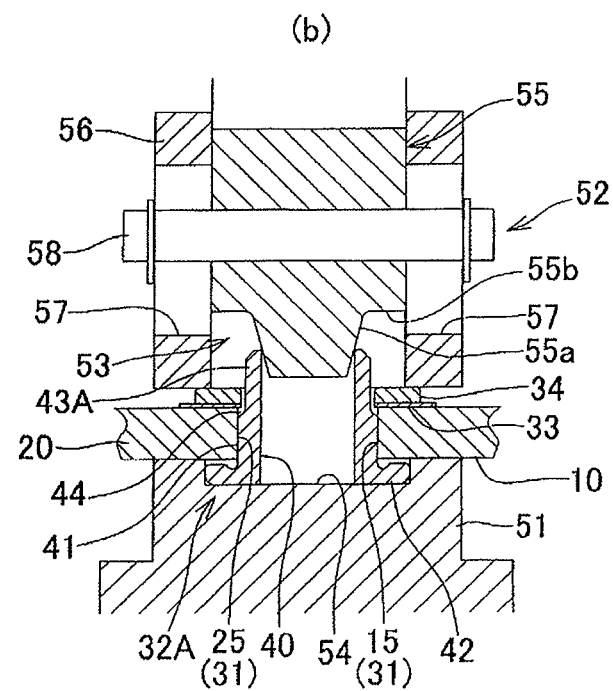
Figure 8:
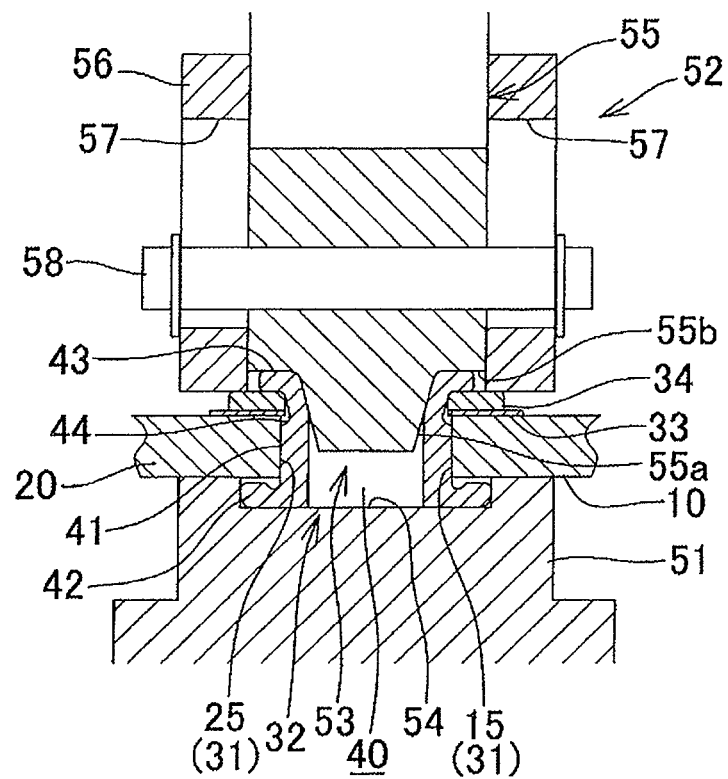
FIG. 8 is an explanatory drawing of the brake disk assembling method illustrating a state that the swaging is completed.

The swaging means 53 includes a punch 55 provided so as to correspond to the housing portion 54 and up-and-down means (not shown in the drawings) for moving the punch 55 up and down as shown in FIGS. 6 to 8. A first molding surface 55a having a cone frustum shape which is inserted into the central hole 40 of the connecting pin 32A to push and extend a tip portion of the to-be-swaged portion 43A outward and a second molding surface 55b for guiding the pushed and extended tip portion of the to-be-swaged portion 43A outward in a radial direction of the connecting pin 32A are provided on a lower end portion of the punch 55. The swaging means 53 is configured such that the to-be-swaged portion 43A can be swaged by the punch 55 while the spring member 33 is being compressed by the compression means 52 through the washer 34 to thereby press-mold the second flange portion 43. In this regard, it is also a preferred embodiment that a plurality of the punches 55 is moved up and down by one up-and-down means to thereby swage a plurality of the connecting pins 32 at the same time.

Now, the compression means 52 will be described. In the compression means 52, a compression member 56 is attached to the outside of the punch 55, a pair of guide slits 57 each having a vertically elongated shape is formed on an outer circumferential portion of the compression member 56, and a restricting pin 58 inserted in and through the guide slits 57 is fixed to the punch 55. The compression member 56 is attached to the punch 55 so as to be movable within a certain distance in an up and down direction with respect to the punch 55 through the guide slits 57. A biasing means 59 which is composed of a compression coil spring for continuously biasing the compression member 56 downward is provided in an upper portion of the punch 55. The punch 55 and the compression member 56 are arranged so as to have such a positional relationship that makes it possible to swage the to-be-swaged portion 43A of the connecting pin 32A by means of the punch 55 to form the second flange portion 43 as shown in FIG. 8 in such a state that the spring member 33 is being compressed by pressing the washer 34 by a lower end portion of the compression member 56 as shown in FIG. 7(*b*). Although the compression means 52 can be provided separately from the swaging means 53, the present embodiment is preferred because it is possible to reduce the number of parts and thereby reduce a manufacturing cost of the assembling device 50 by driving the compression means 52 in conjunction with the swaging means 53. Further, the compression member 56 having any structure can be used as long as it is capable of compressing the spring member 33. Furthermore, the compression member 56 is not necessarily abutted against the upper surface of the washer 34 throughout the entire circumference thereof. For example, it is also possible to use a compression member which is composed of a plurality of rods or a plurality of partially arc-shaped members. Moreover, it is also possible to provide an elastic member such as a rubber on the lower end portion of the compression member 56 in order to compress the spring member 33 in a balanced manner. In addition, when the thickness of the braking disk 10 is different from the thickness of the hub disk 20, it is possible to provide an elastic member composed of a rubber on the lower end portion of the compression member 56 and thereby eliminate the difference of their thickness by the elastic member. Further, it is also possible to form an inclined surface which is adjusted to the thickness of the braking disk 10 and the thickness of the hub disk 20 on the lower end portion of the compression member 56 to thereby arrange the washer 34 and the spring member 33 in a inclined manner, or provide a compression member, instead of the compression member, which is composed of a plurality of rods or a plurality of partially arc-shaped members and press each compression member independently against the washer 34 and the spring member 33, thereby eliminating the difference of their thickness. In this regard, the compression means 52 having a structure other than the structure shown in the drawings can also be used. Further, when the washer 34 is not provided, the spring member 33 is to be directly compressed by the compression member 56.

Next, a method for assembling the floating brake disk 1 will be briefly described with reference to the drawings.

First, as shown in FIG. 6, ten connecting pins 32A are longitudinally set on the supporting board 51 by respectively mounting the first flange portions 42 of the connecting pins 32A in ten housing portions 54 formed on the supporting board 51.

Then, the braking disk 10 is set on an upper surface of the supporting board 51 from above in a state that ten break side connecting concave portions 15 of the braking disk 10 face to ten connecting pins 32A and the hub disk 20 is set on the upper surface of the supporting board 51 from above in a state that ten hub side connecting concave portions 25 of the hub disk 20 face to ten connecting pins 32A.

Then, the spring member 33 and the washer 34 are attached to the outside of the lower portion of the to-be-swaged portion 43A of the connecting pin 32A. After that, the punch 55 is lowered and the to-be-swaged portion 43A of the connecting pin 32A is thereby swaged to form the second flange portion 43. In particular, the punch 55 is firstly lowered until the lower end portion of the compression member 56 is abutted against the washer 34 as shown in FIG. 7(*a*). Then, when the punch 55 is further lowered, the compression member 56 is relatively moved upward against the biasing force of the biasing means 59 and the spring member 33 is compressed by the biasing force of the biasing means 59 as shown in FIG. 7(*b*). Then, when the punch 55 is yet further lowered, the punch 55 is moved downward while the spring member 33 is being compressed by the compression member 56 and the to-be-swaged portion 43A is swaged by the molding surfaces 55*a* and 55*b* to form the second flange portion 43 as shown in FIG. 8, thereby connecting both of the disks 10 and 20 in a floating state by means of the connecting pin 32, the spring member 33, and the washer 34. In this regard, when the washer 34 is not provided, the spring member 33 is firstly attached to the outside of the lower portion of the to-be-swaged portion 43A of the connecting pin 32A. Then, the punch 55 is lowered so as to compress the spring member 33 by the compression member 56. After that, the to-be-swaged portion 43A is swaged by the molding surfaces 55*a* and 55*b* of the punch 55 to form the second flange portion 43, thereby connecting both of the disks 10 and 20 in a floating state by means of the connecting pin 32 and the spring member 33.

In the assembling device 50 and the assembling method, the to-be-swaged portion 43A is swaged by the swaging means 53 while the spring member 33 is being compressed by the compression means 52 to thereby form the second flange portion 43. Therefore, it is possible to prevent a corner of an inner circumferential edge of the washer 34 and an inner circumferential edge of the spring member 33 from getting stuck in a base portion of an outer circumferential surface of the to-be-swaged portion 43A which is trying to extend outwardly when being swaged. As a result of this, it is possible to accurately form the second flange portion 43 in the direction perpendicular to the central axis of the connecting pin 32, thereby making it possible to accurately mount the washer 34 and the spring member 33. Therefore, it becomes possible to effectively prevent a decrease of the connection strength between both of the disks 10 and 20 and generation of vibrations and noises at the time of braking caused by a swaging defect in the connecting pin 32. In this regard, the description has been made with regard to a case where the thickness of the braking disk 10 is the same as that of the hub disk 20 in the present embodiment. However, even when the thickness of the braking disk 10 is different from that of the hub disk 20, both of the disks 10 and 20 can also be connected through the connecting pin 32.

In the floating brake disk manufactured in such a manner, it is possible to effectively prevent the decrease of the connection strength between both of the disks 10 and 20 and the generation of vibrations and noises at the time of braking caused by the swaging defect in the connecting pin 32. Further, since the connecting pin 32 includes the to-be-swaged portion 43A whose inner circumferential surface has a uniform diameter throughout the entire length thereof and the chamfered surface 45A formed on the outer circumferential portion of the end portion of the to-be-swaged portion 43A, it is possible to prevent such a problem that the corrosion-resistant coating layer is damaged when the to-be-swaged portion 43A is swaged to form the second flange portion 43. Furthermore, since the flat annular surface 47 is formed on the side of the second flange portion 43 which faces the washer 34 and the contact area between the second flange portion 43 and the washer 34 is therefore made to be large, it is possible to improve the pull-out strength of the connecting pin 32. In addition, since the stepped portion 44 is formed between the to-be-swaged portion 43A and the body portion 41, and the to-be-swaged portion 43A is configured to be thinner than the body portion 41, it is possible to prevent a swaging load from acting on the body portion 41, thereby making it possible to prevent a deformation of the body portion 41 caused by the swaging load.

Figure 9:
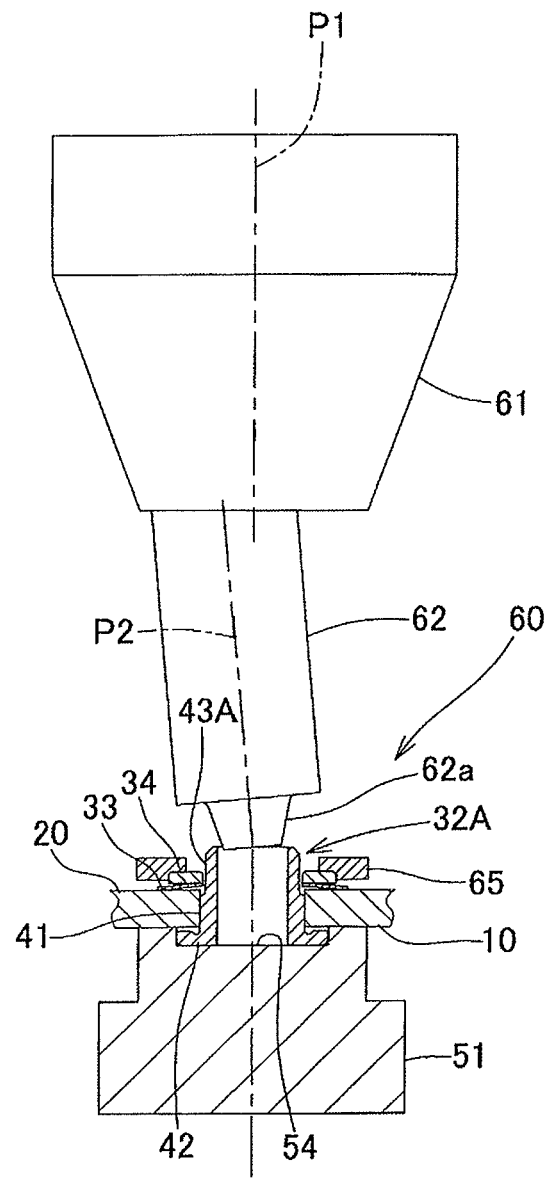
FIG. 9 is an explanatory drawing illustrating an assembling device using an insert.

In this regard, rotary swaging means using an insert can also be utilized as the swaging means 53. In particular, it is possible to use such swaging means as swaging means 60 shown in FIG. 9, which is provided with a supporting head 61 supported so as to be rotatable around a central axis P1, a cylindrical insert 62 being rotatable around a central axis P2 which is arranged so as to be inclined with respect to the central axis P1 of the supporting head 61 at an eccentric position of the supporting head 61, and a supporting board 51 including a concave portion 54 which has the same structure as in the above-described embodiment for mounting the connecting pin 32A thereon, wherein a molding surface 62a having a cone frustum shape and inserted into the central hole 40 of the connecting pin 32A to push and extend the tip portion of the to-be-swaged portion 43A outward is formed on a tip portion of the insert 62, and wherein the molding surface 62a of the insert 62 is made to be pressed against the inner circumferential surface of the tip portion of the to-be-swaged portion 43A while the supporting head 61 is being rotated around the central axis P1 and the insert 62 is being rotated around the central axis P2 so that the to-be-swaged portion 43A can be swaged to form the second flange portion 43. In this case, compression means having a ring-shaped compression member 65 for compressing the spring member 33 by pressing the washer 34 from above is provided separately from the swaging means 53 so as to be movable in an up and down direction as compression means and the to-be-swaged portion 43A is swaged by the swaging means 53 while the spring member 33 is being compressed by the compression member 65 to form the second flange portion 43. In this regard, when the swaging means 60 is used, it is also possible to manufacture a brake disk which is not provided with the washer 34 by swaging the to-be-swaged portion 43A while directly compressing the spring member 33 by the compression member 65.

REFERENCE SIGNS LIST

1 Floating brake disk
10 Braking disk
11 Sliding portion
12 Small hole
13 Concave portion
15 Braking side connecting concave portion
20 Hub disk
21 Mounting hole
22 Bolt inserting hole
23 Lightening hole
25 Hub side connecting concave portion
30 Connecting means
31 Vonnecting hole
32 Vonnecting pin
33 Spring member
34 Washer
32A Connecting pin
32B Connecting pin
32C Connecting pin
32D Connecting pin
32F Connecting pin
40 Central hole
41 Body portion
42 First flange portion
43 Second flange portion
43A To-be-swaged portion
44 Stepped portion
45A Chamfered surface
45B Chamfered surface
45C Chamfered surface
45D Chamfered surface
45F Chamfered surface
46 End face
47 Annular surface
50 Assembling device
51 Supporting board
52 Compression means
53 Swaging means
54 Housing portion
55 Punch
55a First molding surface
55b Second molding surface
56 Compression member
57 Guide slit
58 Restricting pin
59 Biasing means
60 Swaging means
61 Supporting head
62 Insert
62a Molding surface
65 Compression member

The invention claimed is:

1. A method for assembling a floating brake disk, the floating brake disk comprising
an annular plate braking disk having a plurality of braking side connecting concave portions formed on an inner circumferential portion of the braking disk,
a hub disk having a plurality of hub side connecting concave portions opposed to the braking side connecting concave portions on an outer circumferential portion of the hub disk and fitted to an inside of the braking disk,
a connecting pin mounted in a connecting hole formed by butting both of the connecting concave portions together, and
a spring member attached to an outside of the connecting pin, the connecting pin including
a cylindrical body portion to be attached to the connecting hole with substantially no space between the body portion and the connecting hole,
a first flange portion formed on one end portion of the body portion and having a diameter larger than the diameter of the body portion and
a to-be-swaged portion continuously provided on the other end portion of the body portion and capable of forming a second flange portion having a diameter larger than the diameter of the body portion by swaging the to-be-swaged portion,
wherein the connecting pin is mounted in the connecting hole, the spring member is attached to the outside of the connecting pin, and wherein the spring member is compressed and deformed such that the spring member is being compressed and deformed prior to and during the swaging to form the second flange portion.

2. The method for assembling a floating brake disk according to claim 1, wherein the to-be-swaged portion is press molded by a punch to form the second flange portion.

3. The method for assembling a floating brake disk according to claim 1, wherein an insert is pressed against the to-be-swaged portion with being rotated to form the to-be-swaged portion into the second flange portion.

4. The method for assembling a floating brake disk according to claim 1, wherein the connecting pin is mounted in the connecting hole, the spring member and a washer are attached to the outside of the connecting pin, and wherein the spring member is compressed and deformed such that the spring member is being compressed and deformed prior to and during the swaging to form the second flange portion.

5. The method for assembling a floating brake disk according to claim 1, wherein the connecting pin is made of an aluminum alloy.

6. The method for assembling a floating brake disk according to claim 1, wherein the connecting pin includes the to-be-swaged portion having a chamfered surface formed on an outer circumferential surface of a tip portion of the to-be-swaged portion and whose inner circumferential surface has a uniform diameter throughout the entire length and a corrosion-resistant layer formed on an surface of the connecting pin.

7. The method for assembling a floating brake disk according to claim 6, wherein the chamfered surface includes one of a tapered surface, an annular curved surface having a convex arc cross-sectional shape and an annular curved surface having a concave arc cross-sectional shape.

\* \* \* \* \*